June 18, 1957  H. SAUER  2,795,996
OPTICAL DEVICE FOR OBLIQUE PROJECTION APPARATUS
Filed Nov. 12, 1954  2 Sheets-Sheet 1

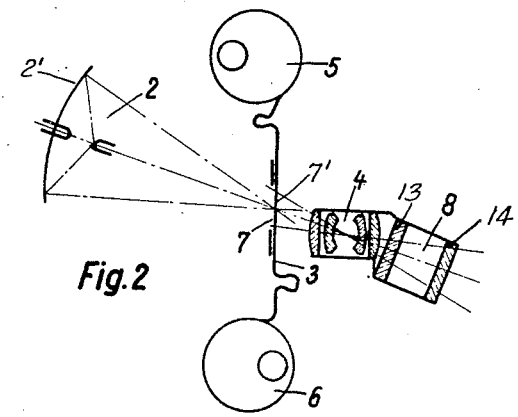
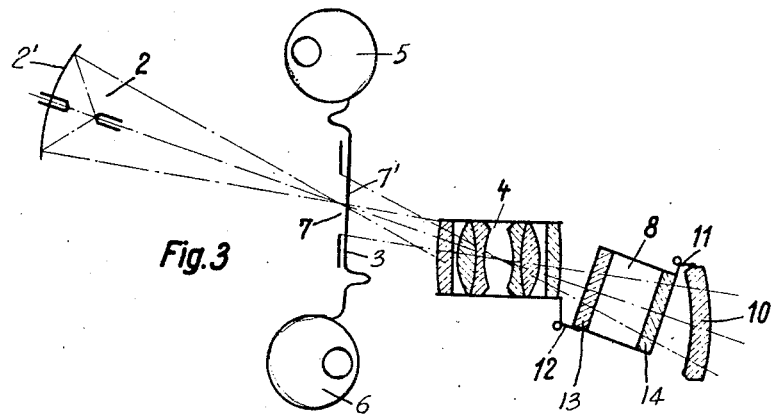

United States Patent Office 2,795,996
Patented June 18, 1957

2,795,996

OPTICAL DEVICE FOR OBLIQUE PROJECTION APPARATUS

Hans Sauer, Heidenheim (Brenz), Wurttemberg, Germany, assignor to Carl Zeiss, Heidenheim (Brenz), Wurttemberg, Germany Application November 12, 1954, Serial No. 468,437

Claims priority, application Germany November 11, 1953

2 Claims. (Cl. 88—24)

Without exception, customary motion-picture machines are designed to have the film in the image aperture run perpendicular to the optical axes of the illumination system and of the projection objective. With these machines, therefore, an undistorted screen image can be attained only when the projection screen is likewise perpendicular to the optical axis.

Since in most motion-picture theaters the projection room is located above the auditorium, the direction of projection is more or less pronouncedly inclined relative to the projection screen, which as a rule is plane and vertical so that the rectangular image format is reproduced in the form of a trapezoid. If the direction of projection is but slightly inclined, then the marginal distortions are covered by the rectangular border of the screen. In addition, these distortions are sometimes rendered less conspicuous to the beholder by slightly tilting the screen rearward. With greater inclinations, the projective distortions become troublesome also in the image content by reason of the convergence of the vertical lines of dip e. g. those lines which are formed at the edges of buildings. It is possible to avoid image distortion by arranging the film plane and the projection surface parallel to one another as well as plumb, and shifting the projection objective at right angles to its optical axis far enough downward to cause the center of the film image to lie in the middle of the screen. Since the illumination under normal conditions is only just able to illuminate the aperture of the projection system, it is further necessary to incline the lamp housing so that the optical axis of the illumination system coincides with the line connecting the film image center and the screen center.

The projective distortions referred to not only grow the more troublesome to the spectator, the more the projecting direction is inclined to the screen, but they also are the more conspicuous the greater the projection angles are, i. e. the greater the screen area is when other conditions are equal. For these reasons, it will be seen that the phenomenon of the lines of dip becomes particularly troublesome with wide-screen projection when anamorphotic systems are used, which are as a rule employed as attachment systems with normal projection objectives.

It was found, however, that by oblique projection with anamorphotic attachment systems, a distortion-free projection image is not obtained with the means just discussed. The reasons for this is, first, that the design of anamorphotic attachment systems involves very great difficulties, if the image angle is to be brought to the magnitude required for the oblique direction of the penetration by rays. In any anamorphotic system which may be considered practicable, an oblique penetration by rays of any noticeable magnitude is unattainable because of the vignetting which then takes effect.

Moreover, there arises with anamorphotic systems a distortion in the form of a curvature of horizontal lines near the upper and lower picture margins. This curvature is the more conspicuous, the larger the angle is which is formed by the rays with the optical axis of the anamorphotic system. If an anamorphotic system designed for an adequately large image angle, together with the projection objective were arranged offset from the image frame center as above described, then a marked curvature of lines horizontal in nature would result on the projection screen.

In accordance with the invention, distortionless oblique projection of films using anamorphotic attachment systems, is realized in an arrangement whereby the plane of the film and the projection screen are approximately parallel, so that the optical axis of the projection objective is at right angles to the plane of the film and is offset to such an extent relative to the image aperture center to cause its image to be formed on the projection screen center, and the anamorphotic attachment system in this arrangement is inclined relative to the projection objective so that its optical axis is nearly parallel to the direction of projection, i. e. parallel to a line connecting the forward principal point of the projection objective and the screen center.

With the arrangement described above, satisfactory distortion-free oblique projection can be obtained in all cases where the angles of inclination to the screen are normal and the projection distance is relatively large. If these conditions are not fulfilled, another step in the sense of the invention consists in having the anamorphotic system followed by an optical auxiliary system, which in the simplest case is a lens of adequate curvature with a focal length about equalling the distance of projection, and whose optical axis is approximately parallel to the axis of the projection objective, i. e. again perpendicular to the film plane and the screen plane.

When screens with cylindrical curvature are to be used, this auxiliary system is preferably so designed as to furnish uniform definition over the whole width of the screen. The projection objective and the anamorphotic system are in this case best set as it would be necessary for projection on an infinitely distant screen.

Additional desirable features within the framework of the invention will be seen possible in connection with the illustrations:

Fig. 2 shows the arrangement of the projection objective in accordance with the invention and of the anamorphotic attachment system relative to the image aperture and the projection screen.

Fig. 3 is a diagram of the combination with a further auxiliary system. This arrangement is particularly recommended in the event of pronounced steep projection as well as relatively short projection distances.

Figure 1:
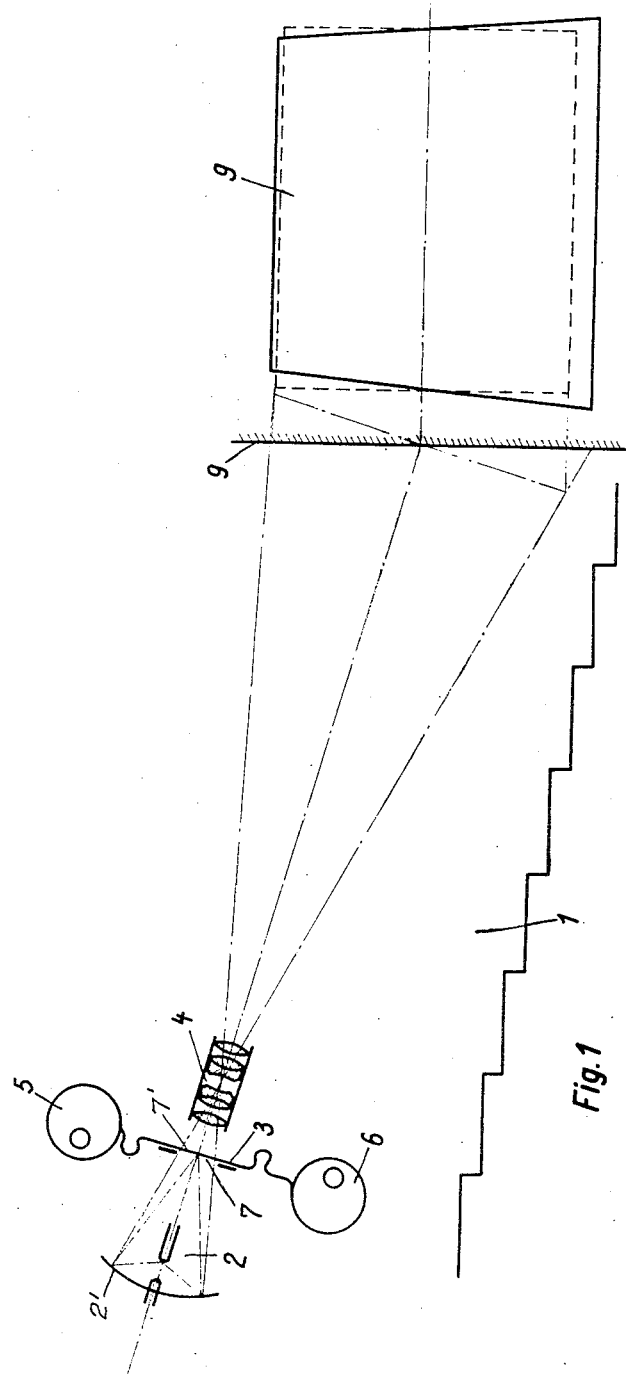
Fig. 1 shows the customary design of the projection arrangement without anamorphotic attachment system in the oblique projection employed in almost all motion-picture theaters. It should be noted that the angle of inclination of the direction of projection relative to the horizontal is intentionally exaggerated.

In the illustrations, 1, represents an auditorium space of the projection arrangement, the parts essential to the invention are likewise diagrammatically indicated, these being a lamp housing 2 with condensor 2', a film pictures plane 3, the projection objective 4 with two film drums 5 and 6, the picture aperture frame 7 with the picture element 7', an anamorphotic attachment system 8 consisting of a positive cylindrical member 13 and a negative cylindrical member 14, and the projection screen 9. In Fig. 1, the known arrangement without anamorphotic system there represented shows how in oblique projection, the trapezoid distortion of the projection image is formed.

In Fig. 2, the arrangement in accordance with the invention is shown, and in Fig. 3 an optical system consisting of one simple lens 10, which is hinged to anamorphotic system 8 by a hinge 11, anamorphotic system 8 being connected by a second hinge 12.

I claim:

1. In an optical picture projection system, in combination, a spherical photographic projection lens, an anamorphosing unit comprising a positive cylindrical member and a negative cylindrical member located in front of said projection lens, means to hold a picture element at one focus of said projection lens, a light source and a condensor for illuminating the aperture of said picture element, and a picture projection screen, said picture element and said picture projection screen located with their surfaces substantially parallel, the optical axis of said projection lens perpendicular to the plane of said picture element surface and offset to the centre of the picture aperture frame such as to form an image on the said projection screen, said anamorphosing unit located with its central optical axis inclined with respect to the optical axis of said projection lens system and substantially parallel to the main projection direction between the forward principal point of said spherical projection lens and the centre of said picture projection screen.

2. In an optical picture projection system according to claim 1 a spherical correcting lens system of slight refractive power with a focal length approximating the projection distance and located in front of said anamorphosing unit with its optical axis substantially parallel to the optical axis of said projection lens.

References Cited in the file of this patent

UNITED STATES PATENTS

| | | |
|---|---|---|
| 1,199,460 | Featherstone | Sept. 26, 1916 |
| 1,283,676 | Comstock et al. | Nov. 5, 1918 |
| 1,291,274 | Ubelmesser | Jan. 14, 1919 |
| 1,651,574 | Beechlyn | Dec. 6, 1927 |
| 1,898,787 | Newcomer | Feb. 21, 1933 |
| 1,932,082 | Newcomer | Oct. 24, 1933 |
| 1,952,522 | Warmisham | Mar. 27, 1934 |
| 2,022,366 | Boecking | Nov. 26, 1935 |
| 2,048,284 | Newcomer | July 21, 1936 |
| 2,187,803 | Griffin | Jan. 23, 1940 |

FOREIGN PATENTS

| | | |
|---|---|---|
| 99,722 | Germany | Oct. 25, 1898 |
| 355,468 | Great Britain | Aug. 25, 1931 |